July 21, 1953

R. I. ROBBINS 2,645,837

FELT HARDENING MACHINE

Filed Sept. 8, 1950

Ralph I. Robbins
INVENTOR

BY Hoag, Kilburn & Carlson

ATTORNEYS.

July 21, 1953 R. I. ROBBINS 2,645,837
FELT HARDENING MACHINE
Filed Sept. 8, 1950 5 Sheets—Sheet 2
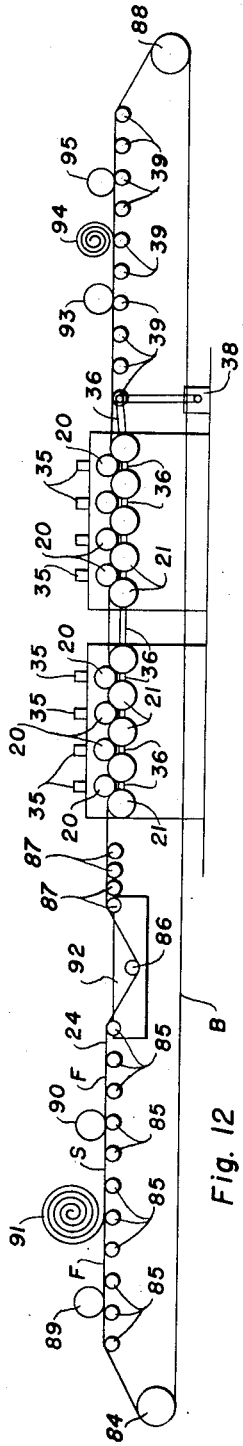
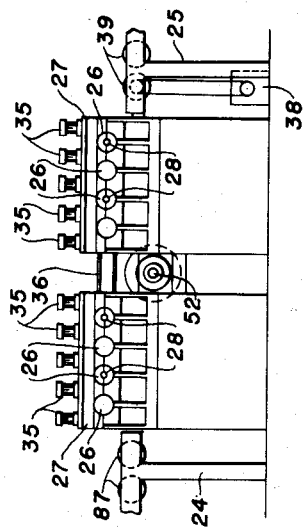
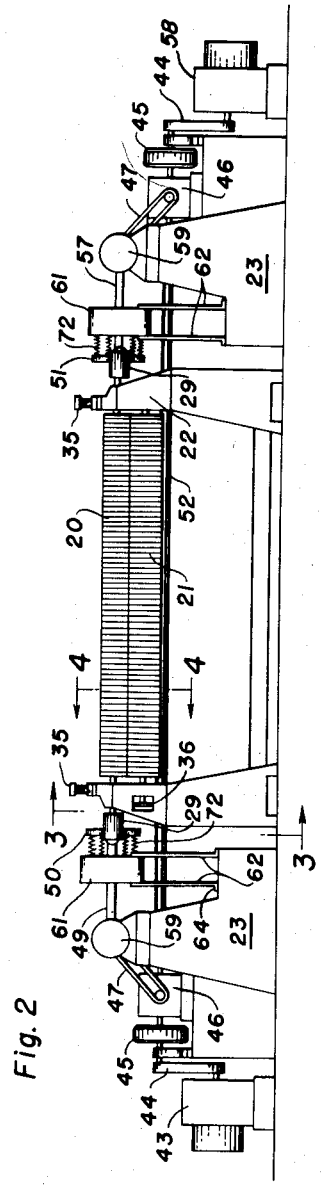
Ralph I. Robbins
INVENTOR
BY Hoag, Kilburn & Carlson
ATTORNEYS.

July 21, 1953 R. I. ROBBINS 2,645,837
FELT HARDENING MACHINE
Filed Sept. 8, 1950 5 Sheets-Sheet 3

Ralph I. Robbins
INVENTOR

BY Hoag, Kilburn & Carlson

ATTORNEYS.

July 21, 1953  R. I. ROBBINS  2,645,837
FELT HARDENING MACHINE
Filed Sept. 8, 1950  5 Sheets-Sheet 4
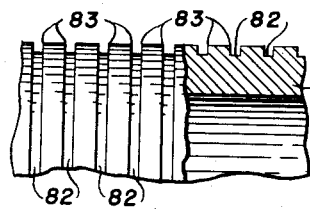
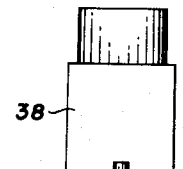
Fig. 8
Fig. 7
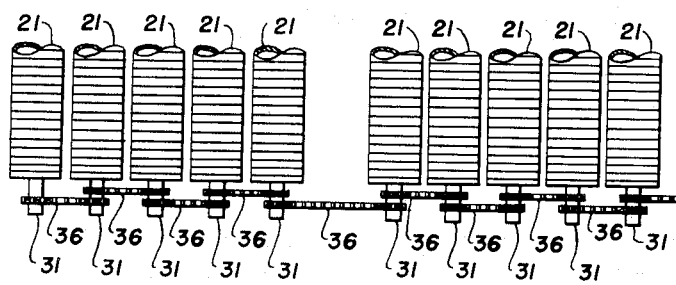
Fig. 6
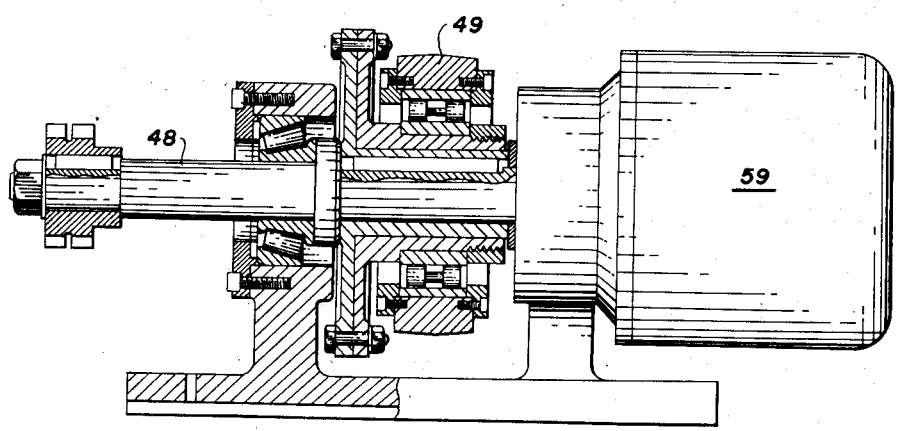
Ralph I. Robbins
INVENTOR.
BY *Hoag, Kilburn & Carlson*
ATTORNEYS.

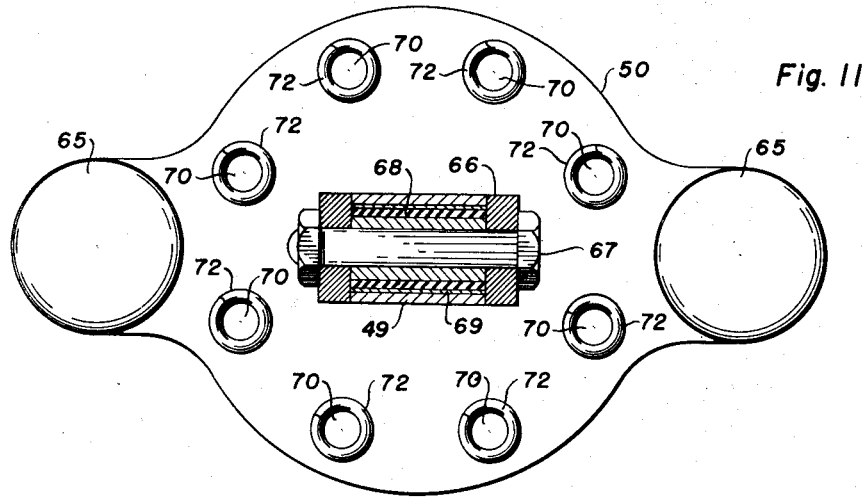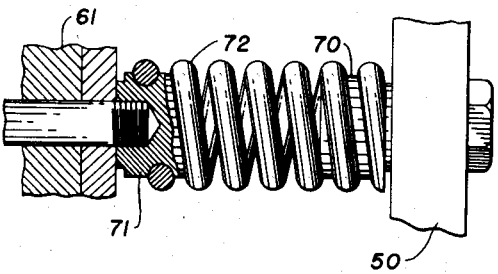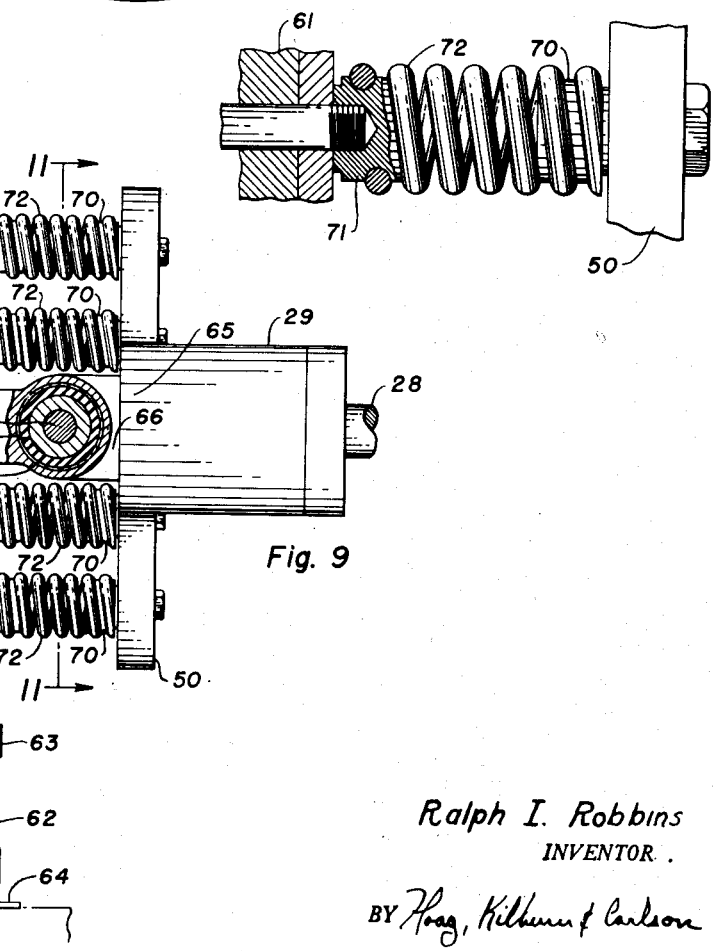

Patented July 21, 1953

2,645,837

UNITED STATES PATENT OFFICE 2,645,837

FELT HARDENING MACHINE

Ralph I. Robbins, Andover, Mass., assignor to American Felt Company, Glenville, Conn., a corporation of Massachusetts Application September 8, 1950, Serial No. 183,832

13 Claims. (Cl. 28—5)

This invention relates to improvements in felt roller hardener machines.

In the process of making felt, the wool or other fibres are carded and multiples of the resulting webs are combined to form a felt batt. This batt may consist of any desired thickness of carded fibres or webs joined all in the same direction, such as lengthwise of the piece, or in different directions, such as crosswise of and lengthwise of the piece. The resultant batt is a piece of material in which the webs have been joined but which has practically no tensile strength because the fibres comprising the individual webs have not been intermingled and interjoined through felting. The next step in the process of making felt is to cause these fibres to intermingle and interjoin to form a homogeneous relatively solid and strong piece of material generally termed in the art as a hardened batt or unfulled felt. The process of transforming the relatively flimsy batt into the stronger more densely packed batt is commonly known in the art as hardening and is accomplished by subjecting the batt to pressure, heat and moisture while at the same time applying to it a reciprocating or vibratory motion which may be rotary or may be transverse to the length of the batt.

In commercial practice two types of machines have been employed to perform this hardening of yardage felts.

One type, which may be termed a platen hardener, comprises a bed arranged to support a section of the batt between conveyor aprons and a relatively heavy plate which may be lowered on that section of the batt and pressed down thereupon at the same time moving in a reciprocatory manner either in a direction back and forth across the batt or in a circular motion. While the section of the batt is being subjected to this pressure and reciprocatory motion, it is also subjected to heat and moisture. When one section of the batt has been subjected to this action for a sufficient period of time, the platen is lifted and the batt moved so that an adjacent section is now in place in the machine to undergo this treatment. This continues until the whole length of the batt has been hardened.

A second type of machine known as a roller hardener was introduced into the art many decades ago. Generally in this type of machine the batt is continuously fed between multiple sets of heated rollers and in passing through them is subjected to pressure, heat, moisture and a reciprocatory motion.

Despite the fact that the roller type machine has an obvious advantage over the platen type in being continuous in operation, its history in the art is not one of success. From time to time since its introduction, attempted improvements have been made in its design and construction and felt manufacturers have eagerly installed the "improved" roller machines only to find that the problem of satisfactory operation has not been solved and to abandon the new roller machines for the old intermittent operating platen machines, or at best to use the roller machines only as an adjunct to the platen machine.

Among the most serious difficulties that have been encountered in the use of roller hardener machines for yardage felts in the past have been the uneven quality of felt produced, the failure to accomplish sufficient hardening in one run and the attendant necessity of running the felt through the hardener several times, inability to harden more than one batt at a time, and maintenance problems generally caused by excessive vibration resulting in wear of the operating parts such as the rollers thus exaggerating the defect of producing yardage felt of uneven quality.

In general it is among the objects of the present invention to provide a felt roller hardener machine for yardage felts in which the above mentioned disadvantages and defects are overcome and to provide a practical felt roller hardener machine which is capable of producing a product of even quality in a continuous manner at a high rate of production and which is designed to minimize operating and maintenance difficulties.

More specifically among the objects and advantages of this invention are:

To provide a roller hardener machine which is capable of increased hardening efficiency over the felt hardeners of the prior art;

To provide a roller hardener machine in which full width batts can be successfully hardened by the machine at a greatly increased speed over those of the prior art;

To provide a roller hardener machine through which a plurality of separate batts can be passed and successfully hardened simultaneously;

To provide a roller hardener machine in which adjustments may be readily made for the satisfactory hardening of batts of varying thicknesses and of different kinds of fibres;

To provide a roller hardener machine in which the upper rollers reciprocate in a direction parallel to their axes at a relatively high speed and in which there is included means insulating the rest of the machine from the vibratory effect of said reciprocations;

To provide a roller hardener machine in which the upper rollers are free to revolve about their respective axes and to reciprocate rapidly in a direction parallel to their axes and in which pairs of upper rollers are elastically coupled to equivalent masses forming mechanically balanced compensating systems for absorbing the vibrations caused by said reciprocations;

To provide a roller hardener machine in which the upper rollers are free to revolve about their respective axes and reciprocate rapidly in a direction parallel to their axes and in which pairs of said upper rollers are elastically coupled to equivalent masses forming mechanically balanced compensating systems, the relative positions of said masses being such that they counterbalance each other;

To provide in a roller hardener machine an elastically coupled compensating system to absorb vibrations caused by the reciprocation of the rollers which is mounted on the base of the machine in an improved manner;

To provide in a roller hardener machine an elastically coupled compensating system to absorb vibrations caused by the reciprocation of the rollers in which the period of vibration of said system is readily adjustable for various speeds of reciprocation.

These and other features and objects of the invention will be best understood and appreciated from the following description of a preferred embodiment thereof selected for purposes of illustration and shown in the accompanying drawings.

The invention accordingly consists in the features of construction, combination of elements and arrangement of parts as will be exemplified in the construction hereinafter described and the scope of the application of which will be indicated in the following claims.

In the accompanying drawings:

Fig. 2 is an elevation of the machine of Fig. 1 viewed from the receiving end with a modification in the arrangement of the motors for the reciprocating drive;

Fig. 3 is a cross-sectional view on the line 3—3 of Fig. 2 looking in the direction of the arrows;

Fig. 6 is a cross-sectional view on the line 6—6 of Fig. 1 looking in the direction of the arrows;

Fig. 7 is a diagrammatic showing of the lower rollers adapted to be used in the machine of Fig. 1 and suitable means for driving the same;

Fig. 8 is a fragmentary section on an enlarged scale cut longitudinally through one of the rollers;

Fig. 9 is an elevation showing the oscillating yoke with compensating springs and weight attached thereto for the embodiment of Fig. 1;

Fig. 10 is a detail showing of one of the compensating springs of Fig. 9 and its connections to the yoke and compensating weight;

Fig. 11 is a cross-section on the line 11—11 of Fig. 9 looking in the direction of the arrows; and Fig. 12 is a schematic drawing showing an arrangement of the machine of Fig. 1 in combination with parts used to handle the material set up for one mode of operation.

Figure 1:
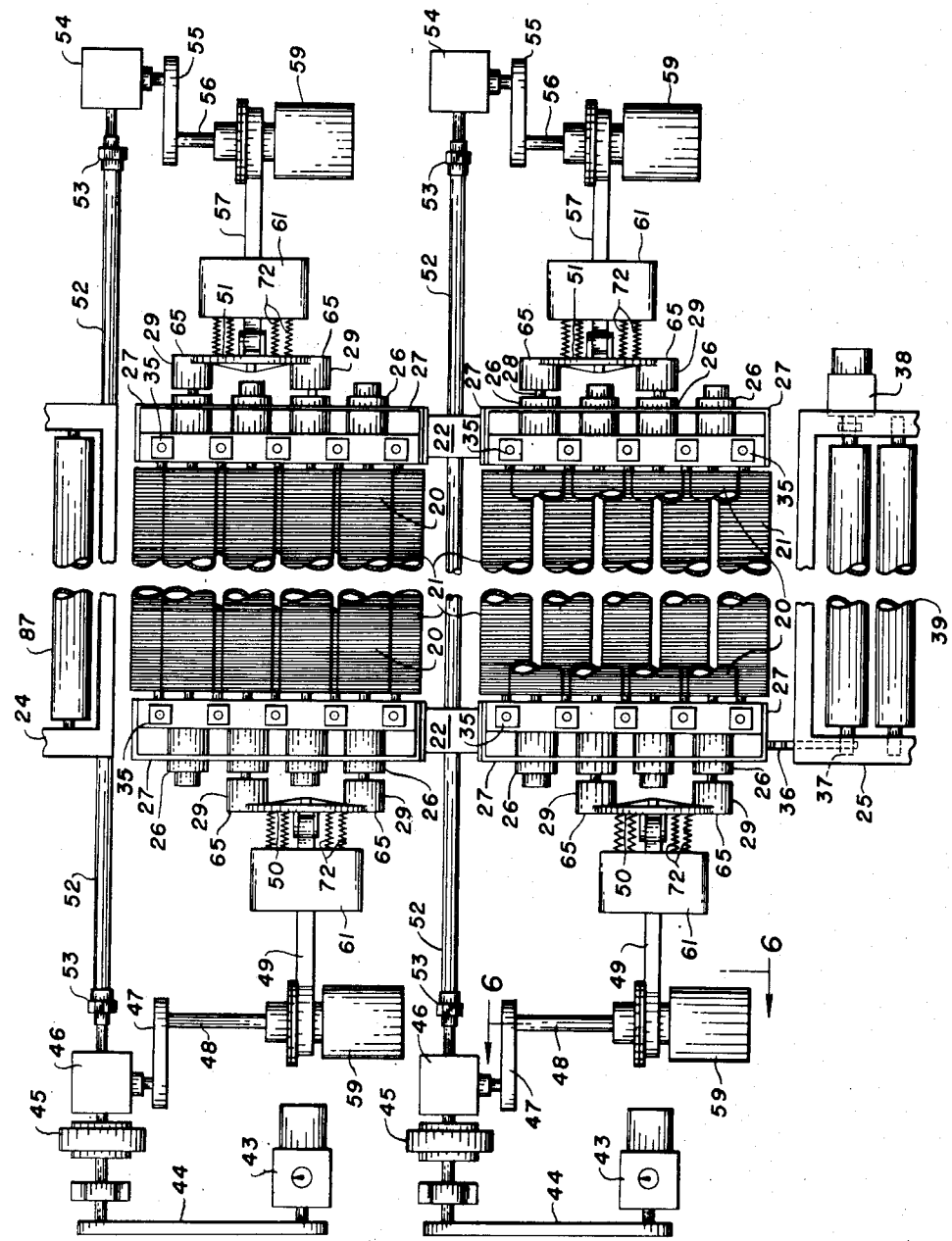
Fig. 1 is a plan view of a machine embodying the invention showing a portion of the feeding and receiving tables.

Essentially the machine is made up of one or more units of upper 20 and lower 21 rollers between which the material to be hardened is fed. In the embodiment shown in the drawings, as may readily be seen from Figs. 1 and 2, the machine comprises two units each of which has four upper and five lower rollers. It is to be understood, however, that the machine may comprise but one unit or as many units as is desired for the circumstances under which it is used. It is advantageous, however, for some aspects of the invention that each unit comprise an even number of pairs of upper rollers, that is, a minimum of nine rollers.

The frame 22 of the machine is firmly mounted on substantial foundations 23 as is clearly shown in Fig. 2 and, as shown in Fig. 1, has mounted adjacent to it a feeding table 24 and a receiving table 25. The various prime movers, clutches, brakes and other driving mechanisms all of which will be described more in detail hereinbelow may be mounted on separate foundations or, if desired, upon a foundation or base made integral with that for the main part of the machine.

The housings 26 for the bearings for upper rollers 20 are mounted on frame 22 by means of bearing blocks 27. As is shown in Fig. 1, the shafts 28 of upper rollers 20 extend at one of their ends beyond bearing housings 26 into thrust bearings enclosed in thrust bearing housings 29 which, as is more fully described hereinbelow, impart a reciprocating longitudinal motion to the upper rollers 20 to which they are connected. Thrust bearing housings 29 are arranged so that the ones for alternate upper rollers 20 are on the same side of frame 22.

As is most readily seen in Figs. 4 and 5 bearings 30 for shafts 31 of lower rollers 21 are mounted in yokes 32 which are moveable in an up and down direction by piston rods 33 attached to pistons 34 of pneumatic cylinders 35 in a manner to be described hereinbelow. Lower rollers 21 are rotated about their respective axes by common driving means which may be a series of belts or chains 36 as is shown diagrammatically in Fig. 7, driven from a shaft 37 in turn driven by a motor or other prime mover 38. It is to be understood that any driving arrangement which drives all of lower rollers 21 in the same direction and at the same speeds may be substituted for the arrangement shown in Fig. 7. In the arrangement shown in Fig. 7, one of the receiving table rollers 39 is mounted on shaft 37.

Figure 4:
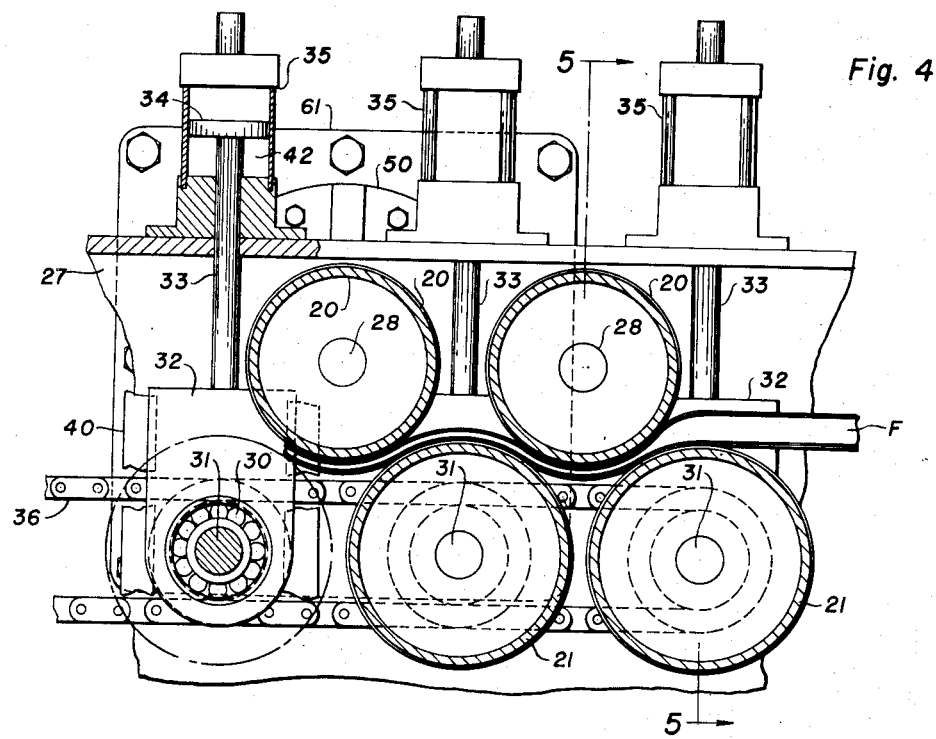
Fig. 4 is a cross-sectional view on the line 4—4 of Fig. 2 looking in the direction of the arrows with certain parts cut away.

The material F to be hardened passes between the sets of upper rollers 20 and lower rollers 21 in a direction from, say from top to bottom as shown in Fig. 1 left to right, as shown in Figs. 3 and 12 and right to left as viewed in Fig. 4. Material F is carried on a conveyor apron B which passes through the machine and between the upper and lower rollers. In some instances it may be desirable to run the material F through the machine between two conveyor aprons, an upper apron and a lower apron. As has been previously stated one of the essential operations on the material to harden it is to exert pressure on it. The means for accomplishing this in the embodiment of the invention herein described is best shown in relation to Figs. 4 and 5. Each shaft 31 of lower rollers 21 is rotatably held in a bearing 30 which in turn is mounted in a yoke 32. Yokes 32 are free to slide up and down but are prevented from any lateral motion by guides 40 which are machined to receive and permit slidable motion of the opposite edges of yokes 32 and which are cast integrally with or otherwise firmly attached to upper roller bearing block 27. Pneumatic or hydraulic cylinders 35 mounted on upper roller bearing block 27 are connected by any suitable means such as by inlet connection 41 to a source (not shown) of fluid under relatively high pressure. Preferably the pressure of the fluid may be regulated. Pneumatic pistons 34 are slideably mounted in cylinders 35 forming pressure chambers 42 below the pistons. Pistons 34 are each respectively attached to piston rods 33 which extend through properly packed apertures in the bottom of cylinders 35 provided for that purpose. Yokes 32 are connected respectively to the other ends of piston rods 33. It is obvious from the above description that when the fluid pressure in pressure chambers 42 is increased pistons 34, piston rods 33, yokes 32 and shafts 31 of lower rollers 21 are urged upward with the result, since upper rollers 20, although free to oscillate longitudinally and to rotate, are otherwise fixed, the pressure on material F between upper rollers 20 and lower rollers 21 is increased.

The mechanism and arrangement of parts to cause upper rollers 20 to oscillate along their respective axes is most readily described with relation to Figs. 1, 2 and 6. Referring specifically to Fig. 1, a motor or other suitable prime mover 43 drives, through chain or belt 44, hydraulic coupling 45, gear assembly 46 and chain or belt 47, shaft 48. Rotatably mounted on shaft 48 is eccentric crank 49 which translates the rotary motion of shaft 48 to a reciprocatory motion given oscillating yoke 50 to which it is pivoted as is more clearly shown in Figs. 9 and 11 and as will be described in more detail hereinbelow. Each oscillating yoke 50 is attached to or may be made integral with thrust bearing housings 29 for the shafts 28 of a pair of upper rollers 20 which are disposed in an alternate manner with other upper rollers 20. Thus as is shown in Fig. 1, for a unit comprising four upper rollers 20, one yoke 50 oscillates or reciprocates the second and fourth upper rollers 20 and a second yoke 51 oscillates or reciprocates the first and third upper rollers 20, all reading from the top to bottom. Oscillating yoke 51 may be driven by motor 43 through chain or belt 44, hydraulic coupling 45, gear assembly 46, shaft 52 coupled at each end by flexible couplings 53 and passing to the other side of the machine, gear assembly 54, transmission belt or chain 55, eccentric shaft 56 and eccentric crank 57. Since it is desired to have adjacent pairs of upper rollers 20 of a unit oscillate 180° out of phase, there is an advantage from the standpoint of regulation to drive each pair from a common source of power. However, in some instances it may prove more advantageous to drive each pair separately as by a second motor 58, as shown in the modification of Fig. 2, and to provide regulating means to keep the reciprocation of each pair 180° out of phase. Mounted on eccentric shafts 48 and 56 is a conventional magnetic brake 59 the function of which will be explained hereinbelow where the mode of operation of the machine is described.

Referring specifically to Figs. 1, 2, 9 and 11 it may be seen that eccentric cranks 49 and 57 pass through apertures 60 in compensating weights 61 which are mounted on base 23 by means of resilient supports 62. Supports 62 may be made of strips of Micarta, a laminated fiber or fabric impregnated and bonded by a cured plastic or any other suitable material of sufficient compressive strength to support a weight 61. They may be attached to weight 61 and base 23 in any suitable manner as by brackets 63, 64 respectively. Oscillator yokes 50 and 51 are primarily of a generally circular shape but have two horizontally diametrically opposed generally circular ear-like portions 65 each adapted to be attached to or cast integral with a thrust bearing housing 29 as may most readily be seen in Fig. 11. Generally centrally located in oscillating yokes 50 and 51 there is positioned a pair of lugs 66 extending from the face of the main portion of yokes 50 and 51 back in the direction of compensating weights 61. A bearing pin 67 is held in place in each pair of lugs 66 and preferably a metal sheathed rubber or other type of resilient bushing 68 is fitted around each bearing pin 67 to form a bearing within an aperture 69 formed near the end of eccentric cranks 49 and 57 for that purpose.

Studs 70 are formed on each oscillating yoke 50 and 51 near the periphery of the same and arranged with their center on a circular circumference. Similar studs 71 are formed on the face of each compensating weight 61 which faces its respective oscillating yoke 50 and 51 and each is in line with a stud 70. The purpose of studs 70 and 71 as is shown in Fig. 10 is to support the series of compensating compression springs 72 for each oscillator yoke 50 or 51. The weight of weights 61 and the number and stiffness of springs 72 are chosen with respect to the weight of a pair of upper rollers 20 and the speed of their reciprocation to constitute a mechanically balanced compensating system which when the machine is in operation will be 180° out of phase with the reciprocation of its respective pair of upper rollers.

Figure 5:
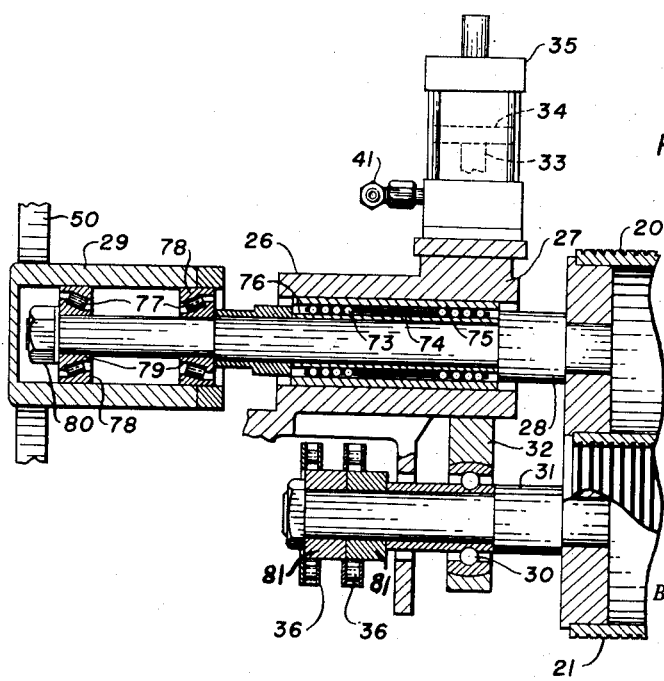
Fig. 5 is a cross-sectional view on the line 5—5 of Fig. 4 looking in the direction of the arrows.

Referring to Fig. 5 it may be seen that one end of each shaft 28 of upper rollers 20 extends through an upper roller bearing housing 26, which as above stated is mounted upon bearing block 27, and terminates in its respective thrust bearing housing 29. Bearing housings 26 enclose a bearing which has a number of ball races 73 held in suitable ball race guide 74. The balls of races 73 bear upon bearing surface 75 keyed to revolve on shaft 28. These bearings are thus designed to permit with a minimum of friction longitudinal movement as well as rotation of shafts 28. Thrust bearing housings 29 enclose bearings designed to permit free rotation of shaft 28. They comprise two sets of shock mounted rollers 77 which are of frusto-conical shape and which bear upon bearing surfaces 78 fixed to housings 29 and bearing surfaces 79 keyed to shafts 28. Lock nuts 80 are threaded on the end of shafts 28 to hold the thrust bearing assemblies in place.

Further reference to Fig. 5 shows the mounting of pneumatic cylinders 35 on bearing blocks 27 and shows shafts 31 of lower rollers 21 extending through yokes 32 and having mounted on their ends gears or wheels 81 for the reception of driving chains or belts 36 arranged as shown in Fig. 7.

As was stated above the weight of compensating weights 61 and the number and stiffness of springs 72 are chosen with respect to the weight and speed of reciprocatory motion of a pair of upper rollers 20 to constitute a mechanically balanced compensating system 180° out of phase with the reciprocation of its rollers so that a minimum of vibration is transmitted from rollers 20 to frame 22 and other parts of the machine. When the speed of reciprocation of upper rollers 20 is changed, the natural period of vibration of the compensating systems comprising weights 61 and springs 72 must be changed. This can be accomplished by arranging springs 72 so that one or more of them may be readily removed. As is shown in Figs. 9 and 11, eight springs 72 may be used and, as is shown in Fig. 10, any of the eight may be readily removed by unscrewing respective stud 70 on oscillator yoke 50 and removing the spring. The actual number of springs 72 used for each oscillator yoke on a particular machine is not critical but should be chosen so that the removal of one or more alters the natural period of the compensating system to correspond to the desired and predetermined reduced speeds of reciprocation of upper rollers 20. However, the number of springs 72 for each oscillator yoke 50 or 51 should be sufficient so that several of them can be removed without having an arc of over about 90° between any of the remaining springs.

Hydraulic couplings 45 are interposed in the driving train between motors 43 and eccentric cranks 49 or 57 to prevent any momentary shock and resultant injury to motors 43 particularly during the periods of starting and stopping the machine.

When the machine is in operation and motors 43 are started the reciprocation of upper rollers 20 will not come up to full speed immediately. During this period and up through the resonant point of the springs, instead of 180° out of phase with the reciprocating system, the compensating masses stay in phase with the motion of the rollers. Under short strokes the acceleration period is so brief that no difficulty is experienced in passing through this resonant period. At longer strokes it is sometimes necessary to hold the weights in some manner until the rollers have reached full speed and then to release them. The compensating masses immediately take the opposite and compensating stroke to the rollers. When motors 43 are stopped, however, the mass of the pairs of upper rollers 20 is so great that it takes an appreciable length of time for them to stop reciprocating. During this time of deceleration, the system passes through the resonant period of the springs, at which point the load forces are at a maximum. Any prolonged period of this excessive vibration could result in damage to the machine. To prevent this, magnetic brakes 59 are mounted on shafts 48 and 56 and arranged to become operative when motors 43 are shut off in order to hasten the deceleration of the machine and thus cut down the length of time of the in-resonance period to a minimum.

Adjustments in the speed of rotation of lower rollers 21 are accomplished by adjusting the speed of motor 38 or other prime mover used for this purpose. Adjustments in the speed of reciprocation of upper rollers 20 may be accomplished by adjusting the speed of motors 43, the gear ratios of gear assemblies 46 and 54 or the ratio of the sprocket wheels or pulley for chain or belt drives 47 and 55.

The amplitude of the reciprocation of upper rollers 20 is dependent upon the throw of eccentrics 49 and 57 and, therefore, may be adjusted by changing the throw of those eccentrics or replacing them by other eccentrics having the desired throw.

The pressure exerted on the material F may be varied, as explained above, by changing the pressure of the fluid introduced into pressure chambers 42. An increase in pressure of this fluid increases the pressure on material F. It is further possible by proper connections and reducing valves (not shown) in a multiple unit machine to apply a different pressure on the material F when passing between the rollers of one unit than when passing between the rollers of the other units.

In order to grip aprons B or material F positively and to transmit efficiently to the material F the reciprocatory motion of upper rollers 20, both upper rollers 20 and lower rollers 21 have circumferential grooves cut in them. These grooves may be of the same shape for upper rollers 20 and lower rollers 21 and are shown at 82 in Fig. 8 for, by way of example, an upper roller 20. They may be milled or formed in any other suitable manner on the rollers but it is essential that the edges 83 formed at the surface of the rollers by the grooves be sharp in order to grip the apron B or material F in a positive and efficient manner.

The mode of operation of a machine constructed in accordance with the present invention is best described by reference to Fig. 12. In the example represented by this figure two batts are hardened at the same time, but it is to be understood that the machine may also be operated with only one batt or with a larger number of batts than two such as six or eight. Further in the example represented by Fig. 12 only one apron B is used although, as stated above, in some instances it will be found desirable to use an apron both above and under the material F.

Apron B is a continuous apron which may be of any suitable material such as canvas or burlap which presents a sufficiently rough surface to cause the batt to cling to it. Apron B passes around roller 84, over series of feed table rollers 85, under roller 86, over another series of feed table rollers 87, between upper rollers 20 and lower rollers 21, over receiving table rollers 39, around roller 88 and back to roller 84. Power is applied to one or more receiving table rollers 39 and to lower rollers 21 as explained above. Rollers 84, 85, 87, 21, 39, and 88 all rotate in a clockwise direction as viewed in Fig. 12. Roller 86 and upper rollers 20 rotate in a counter-clockwise direction as viewed in that figure. No direct power is applied to upper rollers 20, their rotation being caused by frictional drive from contact with the material F or an upper apron, if used. When necessary there may be added in any convenient place adjustable take-up rollers (not shown) to overcome any stretching of apron B. The same result may be accomplished by having either roller 84 or roller 88 mounted in its respective bearing so that it may be moved lengthwise of the machine so that the path of travel of apron B may be shortened or lengthened as desired.

One batt of the material F wound on a roll 89 is placed on apron B on feeding table 24 properly arranged and aligned so that the material will be unwound and travel along with apron B as it passes between upper rollers 20 and lower rollers 21. The second batt of the material F wound on a roll 90 is also placed on apron B on feeding table 24 properly arranged and aligned so that the material will be unwound and will pass between upper rollers 20 and lower rollers 21. Roll 91 carrying a separator cloth S is placed on apron B between rolls 89 and 90 so that the separator cloth unwinds and is carried along on top of the material F that was wound on roll 89. After passing roll 90 there are now on feed table 24 several layers which from the bottom to the top are apron B, material F from roll 89, separator S and material F from roll 90. They pass between upper rollers 20 and lower rollers 21 in this arrangement.

Situated conveniently and built into feed table 24 in any desired manner is a steam bath 92. The above described layers are pulled through bath 92 by reason of roller 86 which is depressed below the surface of feed table 24. Steam bath 92 may take any desired form into which steam is brought into contact with the material F.

After passing through steam bath 92 the layers travel over rollers 87 on feed table 24 and finally enter the main portion of the machine being drawn between upper rollers 20 and lower rollers 21. It is to be noted that since the axes of upper rollers 20 and lower rollers 21 are not in the same vertical planes that the layers in passing between them follow a wavy or sinuous path. When a machine comprises several units as in the embodiment described herein the above described layers pass from the first unit to the second and so on until they emerge on receiving table 25.

Receiving table 25 is equipped with rollers 39 over which apron B and the layers it carries are passed. Several wind-up rolls are placed on receiving table 25. In the present example roll 93, placed closest to the main part of the machine is arranged to wind up material F, now hardened, from feed roll 91, roll 94 is arranged to wind up separator S and roll 95 is arranged to wind up material F, now hardened, from feed roll 89. Apron B as above stated continues on around roller 88.

In the embodiment discussed above two batts of material are hardened at the same time. Should it be desired to harden more than two batts at the same time, additional feed rolls carrying batts and similar to rolls 89 and 90 are placed on feed table 24 with a roll for a separator cloth between each. Similar provision of additional wind-up rolls is made on receiving table 25. The important consideration is that the layers passing between upper rollers 20 and lower rollers 21 from the bottom up are apron, material, separator, material, and so on with a top apron, if used, on top.

I claim:

1. In a roller hardening machine of the class described in which means are provided for driving a plurality of rollers in a reciprocatory motion along their respective axes at a relatively high rate of reciprocation, means for substantially preventing the transmission of vibration from said rollers and their driving means to the frame and other portions of the machine comprising a compensating weight, resilient supporting means between said compensating weight and said frame and additional resilient means attaching said compensating weight to said driving means.

2. In a roller hardening machine of the class described in which means are provided for driving at least some of the rollers in a reciprocatory motion along their respective axes at a relatively high rate of reciprocation, means for substantially preventing transmission of vibration from said rollers to the frame and other portions of the machine comprising compensating weights, a non-rigid but non-compressible framework between said compensating weights and said frame individually supporting said compensating weights on said frame, a plurality of compression springs disposed to attach said compensating weights individually to said driving means.

3. In a roller hardener machine of the class described in which at least some of the rollers are given a reciprocatory motion in a direction along their axes at a relatively high rate of reciprocation, driving means for imparting said motion to said rollers, individual means for each pair of said rollers for substantially preventing the transmission of vibration from said rollers to the frame and other parts of said machine comprising a yoke having a circular portion included in said driving means, a compensating mass, a non-rigid framework supporting said compensating mass on said frame and a plurality of compression springs arranged to couple said compensating mass to said circular portion of said yoke.

4. In a roller hardener machine of the class described having at least one set of four rollers the axes of which are in substantially the same plane and parallel to each other adapted to be reciprocated in a direction along their respective axes at a relatively high rate of reciprocation, a first driving means for producing such reciprocatory motion upon a first pair of said rollers, a first vibration damping means associated with said first pair of rollers, a second driving means for producing such reciprocatory motion upon a second pair of said rollers, a second vibration damping means associated with said second pair of rollers, said rollers of each of said pair being alternatively disposed with respect to the rollers of said other pair.

5. The combination of claim 4 in which the driving means and vibration damping means for the first pair of said rollers is mounted on the frame of the machine adjacent to one end of said rollers and the driving means and vibration damping means for the second pair of said rollers is mounted on the frame of the machine adjacent to the other end of said rollers.

6. The combination of claim 4 in which the first and second driving means are arranged to drive each of their respective pairs of rollers 180° out of phase to the other pair.

7. The combination of claim 4 in which said driving means are arranged so that when the first pair of rollers is travelling in one direction the second pair of rollers is travelling in the opposite direction.

8. In a roller hardening machine of the class described having a rigid and stationary frame and in which a plurality of rollers are reciprocated at a relatively high rate of reciprocation in a direction parallel to their respective axes and said rate of reciprocation is variable, vibration damping means associated with said rollers comprising a mechanically balanced system including a compensating mass, resilient supports for said compensating mass on said frame of said machine, and a resilient connection attaching said compensating mass and said rollers in which said resilient connection can be altered to change the natural period of mechanical resonance of said system.

9. In a roller hardening machine of the class described having a rigid and stationary frame and in which a plurality of rollers are reciprocated in pairs at a relatively high rate of reciprocation in a direction parallel to their respective axes, variable speed driving means for reciprocating each pair of said rollers, vibration damping means for each pair of said rollers comprising a mechanically balanced system including a compensating mass supported on said frame of said machine, a plurality of spring members attaching said compensating mass to said pair of rollers, and means for altering the number of said spring members whereby the natural period of mechanical resonance of said system may be changed.

10. In a roller hardening machine of the class described a mechanically balanced system for each pair of axially reciprocating rollers for prevention of the transmission of vibrations from said rollers to the frame and other parts of said machine comprising a compensating mass supported both between said rollers and the frame of said machine, resilient members arranged to support said mass on said rollers and other resilient members to support said mass on said frame, means for changing the resiliency of the resilient members between said mass and said rollers.

11. In a roller hardening machine of the class described a driving yoke having a central portion and two outer portions mechanically connecting a driving arm and a pair of rollers, the central portion of said yoke being of generally circular configuration each of said two outer portions being mechanically connected to a roller, a compensating mass resiliently supported on the frame of said machine and a plurality of coil compression springs bearing against said mass and said central portion of said yoke and tending to separate them.

12. In a roller hardening machine of the class described a driving yoke mechanically connecting a driving arm and a pair of rollers, a thrust bearing securing said yoke to each of said rollers, a central portion of said yoke, said driving arm rotatably connected to said central portion, a plurality of coil compression springs having their ends abutting said central portion of said yoke outside of the connection of said driving arm thereto, a mass and a resilient framework for supporting said mass on the frame of said machine said mass disposed to abut the other ends of said coil springs, an aperture in said mass disposed to form a space through which said driving arm passes.

13. In a roller hardener machine of the class described having at least two pairs of rollers with the rollers of each pair alternately disposed with respect to the rollers of said other pair, each of said pairs of rollers adapted to be reciprocated in a direction along the respective axes of said rollers at a relatively high rate of reciprocation, individual driving means for each pair of said rollers for producing such reciprocation, individual damping means for each pair of said rollers associated with the driving means for said pair of rollers and arranged to absorb horizontal forces, thrusts and vibrations, the arrangement of mounting said damping means and the associated driving means for one pair of rollers on the same side of the machine and mounting said damping means and its associated driving means for said other pair of rollers on the opposite side of the machine.

RALPH I. ROBBINS.

References Cited in the file of this patent
UNITED STATES PATENTS

| Number | Name | Date |
| --- | --- | --- |
| 1,720,574 | Schieferstein | July 9, 1929 |
| 1,918,456 | Dodge | July 18, 1933 |
| 1,984,700 | Reynolds | Dec. 18, 1934 |
| 2,169,372 | Pecker | Aug. 15, 1939 |
| 2,575,143 | Strain | Nov. 13, 1951 |